United States Patent Office 2,833,507
Patented May 6, 1958

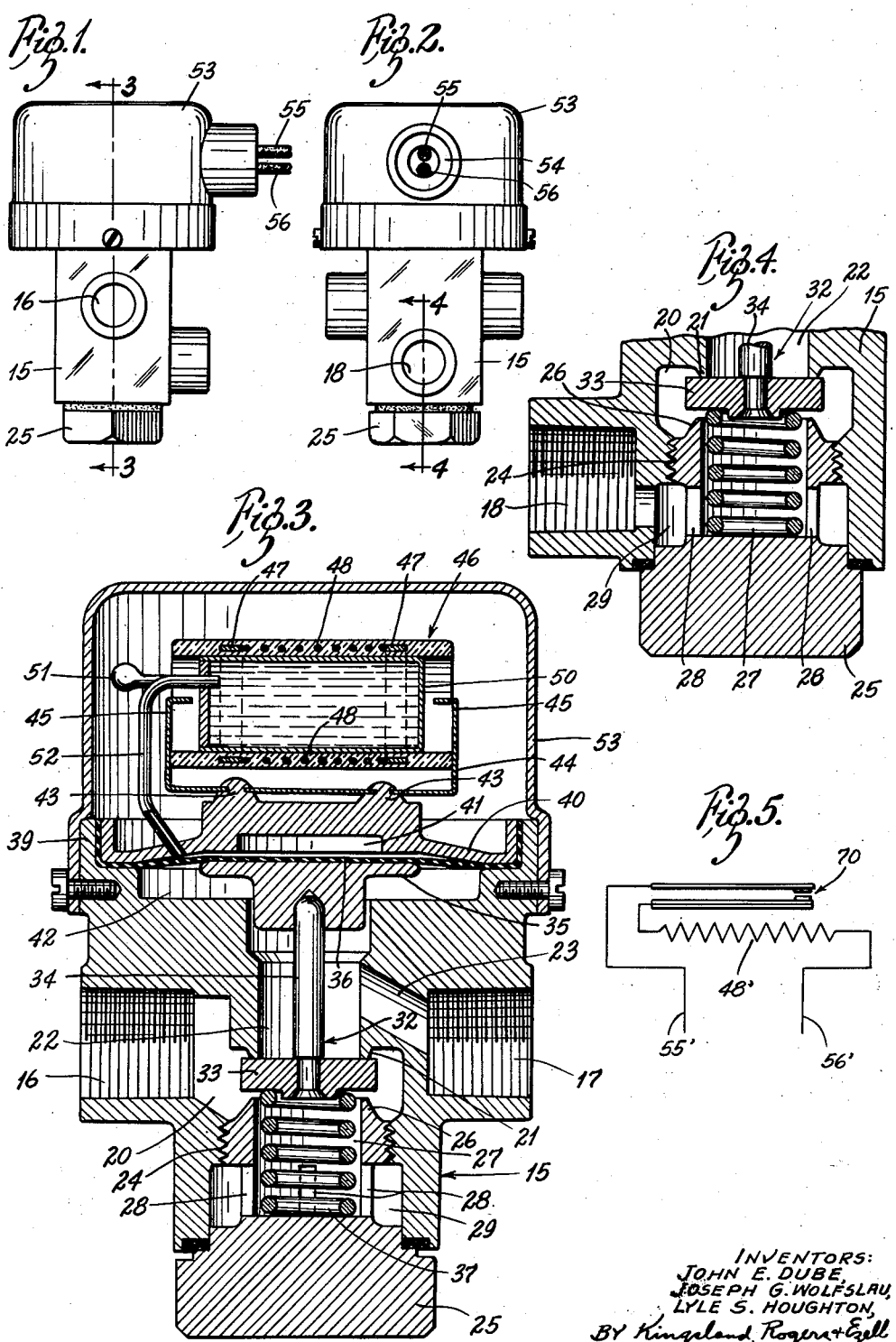

2,833,507
HEAT MOTOR VALVE

John E. Dube, Chesterfield, and Joseph G. Wolfslau and Lyle S. Houghton, St. Louis County, Mo., assignors to Alco Valve Company, University City, Mo., a corporation of Missouri Application October 22, 1953, Serial No. 387,766

10 Claims. (Cl. 251—11)

The present invention relates to a heat motor valve.

Heretofore valves have been made that are designed to be opened or closed in response to heat motors. Sometimes such motors consist of enclosed chambers containing a fluid that changes volume and pressure in response to the application and removal of heat therefrom, such heat ordinarily being supplied by means of an electric resistance coil.

One of the problems of such valves is that the expansion element which necessarily must respond to the conditions of the applied heat in order to cause the valve to function properly, is so located and arranged that it may be influenced by the temperatures of the valve body and associated parts. It is readily understandable that if the valve is conducting a cold or a warm fluid, the fluid being conducted will change the temperature of the valve body in accordance with the rate of flow. This latter is particularly true if the valve operates between a completely closed and an open position, since when the valve is closed, the assembly tends to assume room or ambient temperatures, but when the valve is opened, it tends to assume a different temperature that is substantially that of the fluid being conducted.

These changes in temperature of the valve assembly have provided a difficult problem to accurate operation of heat motor valves. The temperature of the power element of the heat motor should be that provided from the sensitive element. But actually the temperature of the heat power element is a resultant of that provided from the sensitive element and that from other sources, such as from the fluid conducted through the valve as heretofore noted. Since the heat change from the fluid conducted through the valve may have an inconsistent and variable effect upon the heat motor, it renders the heat motor inconsistent and variable in operation.

It is an object of the present invention to design a heat motor valve that has minimum response to variations in temperature of the valve body resulting from changes in position of the valve. That is to say, it is an object of the invention to provide a heat motor valve wherein there is an expansible fluid system so arranged that the effect on such system of changes in temperature of the valve and valve housing is minimized. Specifically, it is an object of the invention to provide a heat motor that is largely isolated from the rest of the assemblage insofar as heat transfer is concerned; but which, nevertheless, is readily made and assembled at low cost.

An especial object of the invention is to provide a packless heat motor valve with minimum heat effect of the heat conditions of the fluid being carried through the valve. And another object is to provide a heat motor valve with a thermostatic control limiting the maximum temperature of the motor so as to avoid overheating. It is an additional object to provide a heat motor operated valve that has gradual opening and closing to avoid water hammer.

Further objects include a design making for easy servicing and replacement of parts subject to wear.

Other advantages will appear from the drawings and description to follow.

In the drawings:

Figure 1 is a side elevation of one form of valve embodying the present invention;

Figure 2 is a front elevation of the valve taken from the right side of Figure 1;

Figure 3 is a vertical side-to-side section taken on the line 3—3 of Figure 1;

Figure 4 is a vertical front-to-rear section of a fragment of the valve taken on the line 4—4 of Figure 2; and Figure 5 is a schematic view of the heat motor parts of the valve with a thermostat included.

Referring to the valve shown in the drawings, there is a valve housing generally indicated at 15. The valve is illustrated as a three-way valve, although obviously features of the construction can be used with other types of valves. In the valve construction illustrated, there is a port 16, a port 17 and a port 18. The port 18 appears particularly in Figure 4 and is otherwise illustrated as extending out from the front of the lower part of the valve device.

The port 16, which for purposes of this description will be considered an inlet, opens into a valve chamber 20. This portion of the valve body member 15 also contains an upper circular valve seat 21. Likewise, it contains a second valve chamber 22 that connects by a passage 23 with the port 17, which here may be called one of the outlet ports.

The lower end of the valve body 15 has a threaded opening 24 therein which receives a plug 25. The upper end of this plug provides a second, lower valve seat 26, located opposite the upper seat 21. The plug has a vertical port 27 in it that extends downwardly from the valve seat 26 and connects by a plurality of openings 28 through the plug wall, into a space 29 within the lower part of the valve body member 15 and enclosed by the head of the plug member 25. The second outlet 18 comunicates with the chamber 29 (see Figure 4).

A double-acting valve generally designated at 32 has a valve head 33 that can operate back and forth between, and to seat upon, the two oppositely arranged valve seats 21 and 26. The stem 34 of this valve extends upwardly through the chamber 22. At its upper end it fits into a socket in a buffer plate 35, and so is contained therein. The buffer plate is disposed below a diaphragm 36. The valve is normally urged upwardly by a spring 37 located in the chamber 29 so that it moves with the diaphragm 36 as will appear.

The upper end of the valve housing is recessed to provide a narrow, vertical flange 39, the narrow size of which reduces heat conductivity. An upper flanged plate 40 fits into the recess as illustrated and clamps the diaphragm 36 firmly into place and seals the same so as to provide an upper diaphragm chamber 41 and a lower chamber 42 in communication with the outlet 17.

The upper plate 40 has two upstanding bosses 43 over which a thin metal clip 44 is fitted, the bosses being peened over the top of the clip as illustrated. The clip 44 is prepared with two holes by which it may be fitted down a predetermined distance onto the bosses 43, prior to the peening operation. This thin bracket 44, in turn, has its upstanding legs 45 inturned at their ends whereby they may snap into corresponding slots in opposite end edges of a tubular heater unit member 46.

The tubular member 46 comprises a porcelain sleeve molded around a pair of metal rings 47 that are joined by a heater resistance coil 48. As hereafter explained, the coil should have a temperature coefficient of resistance that will reduce wattage after a certain temperature condition is established. The electric power wires are connected to the two rings 47 by two terminal projections (not shown) that appropriately project from the porcelain tube 46.

The tubular member 46 receives and surrounds a sealed capsule 50 that contains a heat responsive fluid that changes from liquid to vapor state within the operating temperature ranges of this instrument. This capsule is connected by a fine capillary tube 52 into the upper diaphragm chamber 41. The capillary should be made small so as to minimize heat conductivity. The capsule 50 has a pinched-off and sealed tube 51, used for a purpose to appear.

A cover 53 is fitted over the heat motor parts and is fastened to the valve housing 15. This cover has a suitable opening 54 through which the electrical leads 55 and 56 may be brought from the coil terminal rings 47 for suitable electrical connection.

The spring clip mounting of the heat motor thus illustrated minimizes conductivity between the heat motor and the valve body. At the same time, the cover 53 minimizes variations in ambient temperature from affecting the heat motor. It may be observed that there are breaks in conductivity from the valve body at the connection between the valve body 15 through the diaphragm 36 and the upper plate 40. Also, conductivity is reduced by the connection between the valve stem 34 and the buffer plate 35, and at the connection between the buffer plate 35 and the diaphragm 36. And similarly, there is a reduced conductivity between the upper plate 40 and the spring clip mounting member 44. The thin clip elements 45 have reduced heat conductivity with the porcelain tubular member 46.

All of the foregoing contributes to minimize heat conductivity between the heat motor capsule element 50 and the valve body, as well as to minimize heat conductivity between the lower parts of the heat motor system, namely the upper diaphragm chamber 41 and associated parts, on the one hand, and the valve body and associated parts, on the other hand. Of course, as will appear, there is inescapably a certain amount of conductivity between parts of the heat motor and the liquid being conducted. But all of this is minimized by this construction.

*Operation*

With a valve in the position shown in Figure 3, assuming that the port 16 is connected to a source of water to be circulated, such as a circulator, the outlet 17 may be connected to the radiator or other means in the space which is to be tempered. The third port 18 may be connected back into the circulator as a bypass.

With such an arrangement and with the valve head 33 closed with the upper valve seat 21, the radiator will be short-circuited and the circulation will proceed from the port 16 past the now open valve seat 26 into the port 27, thence through the passages 28 into the chamber 29, whence it may escape through the port 18 and return to the circulator.

If the circuit to the heating element 48 is closed by conventional means such as a room thermostat, the heater will become heated, and such heat will be transmitted directly into the interior of the capsule 50. This capsule is normally charged with a supply of a liquid that vaporizes and produces an increasing pressure upon heating. Such increased pressure acts through the capillary 52 into the upper diaphragm chamber 41, causing a depression of the diaphragm 36 and along with it an opening of the valve 33 against the force of the spring 37. The rate of movement of the valve is relatively slow, since not only is movement opposed by the spring 37, but also as the valve leaves the seat 21 it admits liquid at some pressure to the outlet chamber 22, which connects to the lower diaphragm chamber 42. This gradual opening (and gradual closing of the bypass) reduces water impact upon the piping.

Thereafter, when the heater 48 is deenergized, the fluid within the capsule 50 recondenses and contracts so that the spring 37 can move the valve back toward the seat 21 and away from the seat 26. The cooling of the unit 48 is relatively slow, so that the reduction of pressure in the upper diaphragm chamber is correspondingly slow, and the valve action is retarded to avoid hammer.

As soon as the valve starts conducting hot or cold water there is a constant supplying or withdrawing of heat to the valve body that varies in accordance with the rate of flow through the valve, and, of course, varies with the temperature of the water. This causes the valve body to change temperature. If it were not for the various means previously described to make the heat pass difficult, there would be a decided change in temperature of the environment of the capsule 50 and the associated parts of the heat motor, so that that motor, instead of reflecting the actual temperature produced by the heating coil 48, would respond to a temperature that is a combination of that produced by the heat coil and that produced by the fluid flowing through the valve. However, with the construction provided, the incidental or environmental heat change produced in the valve body has only a minimized effect upon the heat motor.

This valve is constructed so as to have only a certain maximum pressure in the liquid system consisting of the capsule 50, the capillary 52 and the diaphragm chamber 41. To accomplish this, the capsule 50 is charged with a slight excess of the volatile liquid charge, which normally is a small amount above the level where the capillary 52 enters the capsule 50. The sealing tube 51, still unsealed, is connected with a pressure relief valve. Then the heater 48 is energized and the liquid boiled. Boiling is continued until there is no escape of vapor through the relief valve. That indicates that even at maximum heater temperature no pressure above the desired maximum will be developed in the heat motor system. After this, the tube 51 is sealed off.

In this type of valve operation, it is desirable to require as little wattage as may be possible. For example, if the valve be used to control an individual heating element, such as a steam radiator, in a large building, it may happen that a thousand units will become energized. This means a large load, and it may be one that comes more or less all at once. Such system requires a reasonably prompt operation, which will not be excessively long even under conditions of reduced voltage. There must be ample capacity provided in the heater to operate the valve under such conditions of low voltage. But this means that under other conditions there will be an excess of wattage, and that once the valve has been operated—that is when the heater has become hot enough to have operated the valve; there may thereafter be a further rise in temperature, and consequent waste of heat and electric power.

Therefore, the heater coil 48 is preferably made of a material the resistance of which rises rapidly. Suitable materials with an appropriate high temperature coefficient of resistivity, for example, are nickel and cobalt, and their alloys.

Using such materials, the valve will be operated with suitable promptness after the heater is energized, and thereafter there will be a minimum waste of electricity during the time the heater remains energized.

If the heater unit should require replacement, the electric leads are disconnected and the upstanding parts 45 of the spring metal clip 44 are spread. The sleeve 46 is slipped off the capsule 50, and another one placed over it, connected and engaged by the legs 45.

*Figure 5*

In Figure 5 the coil corresponding to the coil 48 is diagrammatically illustrated at 48' and the leads at 55' and 56'. A bimetallic thermostatic switch 70 is connected in series with the coil 48' and is mounted to be responsive to the temperatures of the heater coil.

A unit of the kind here involved must operate despite wide variations in temperature of the fluid through the valve, and in the potential delivered to the coil. To insure operation despite sharp reduction of potential occurring with very cold fluid transmitted through the valve, a high heat capacity heater must be used. Such heater produces excessive heat during opposite or during normal operating conditions, and requires more electric power than necessary—which latter factor becomes especially important in building installations where there are a large number of these valves in use.

With the thermostat 70 acting as a limit switch, the heater will generate enough heat to provide reasonably rapid valve operation, but will be deenergized when the heat becomes excessive. The operation of the thermostat is to some degree self-compensating because if the fluid transmitted is at an extreme temperature, such as very cold, that will inevitably affect the thermostat to some degree and will delay its opening the heater circuit.

In any case, the thermostat will cycle in a manner to maintain a fairly constant temperature at the sleeve 46, for operating on the liquid in the capsule 50.

What is claimed is:

1. In a valve construction: a valve housing having an inlet, an outlet, and a valve seat therebetween; a valve movable toward and from the valve seat; heat motor means for operating the valve, the valve housing having a diaphragm supporting member positioned within the housing in a non-metallic contacting relation, a non-metallic diaphragm, and a rigid portion of the housing clamping the diaphragm to the supporting member, the diaphragm forming an expansion chamber with the supporting member; a spring-clip element mounted on the supporting member, with upstanding legs, a non-metallic capsule support secured between the legs, a liquid-containing capsule mounted in said support, out of contact with the upstanding legs, said capsule being substantially out of metallic contact with the valve housing and having insulation between it and all points on said valve housing, and a capillary tube connecting the capsule with the expansion chamber; a connection between the valve and the diaphragm for movement of the valve by the diaphragm; and a heater in the capsule support to apply heat to the liquid therein.

2. The combination of claim 1, wherein the spring-clip element has the ends of its upstanding legs inturned toward each other, and the capsule support comprises a tube with its ends slotted to receive the inturned ends of said legs.

3. The combination of claim 1, wherein the valve housing has a recess in its upper end into which the outer portion of the diaphragm is inserted, and the diaphragm supporting member comprises an insert removably secured in said recess and clamping the outer portion of the diaphragm into the housing.

4. In a valve construction: a valve housing having an inlet, an outlet, and a ported partition therebetween; a valve cooperable with the partition to regulate fluid flow from the inlet to the outlet; a pressure chamber in the housing having a pressure-responsive non-metallic movable diaphragm connected with the valve to operate it, said diaphragm being supported at its outer portions between a wall of the housing and a diaphragm supporting member, a volatile-liquid-holding capsule and a capillary tube connecting the pressure chamber and capsule; an electric heating element surrounding the capsule to volatilize the liquid in the capsule; and means supporting the heating element and capsule on but in spaced relation to the valve housing including a connection between the capsule and said diaphragm supporting member, said capsule being substantially out of metallic contact with the valve housing and having insulation between it and all points on said valve housing.

5. The combination of claim 4, wherein the heating element and capsule supporting means comprises a thin metal element with upstanding means projecting from the diaphragm supporting member to support the heating element.

6. The combination of claim 4, wherein there is a thermostatic limit switch preventing excess heat in the heating element.

7. The combination of claim 4, wherein the liquid volume is only sufficient to produce a predetermined maximum pressure in the pressure chamber when the heater is continuously energized.

8. The combination of claim 4, wherein a spring opposes the pressure in the pressure chamber to move the valve, and wherein one side of the diaphragm is in communication within the valve outlet whereby the shifting of the valve upon heating of the heater admits outlet pressure to the side of the diaphragm aforementioned to aid the spring, all to reduce the speed of movement of the valve.

9. The combination of claim 4, with a closure around the heating element to reduce the rate of cooling thereof and slow the shift of the valve.

10. The combination of claim 4, wherein the heating element comprises material having a high thermal coefficient of resistance that causes the wattage required to be reduced after the temperature of the element has become sufficient to cause operation of the valve.

References Cited in the file of this patent

UNITED STATES PATENTS

| 1,394,954 | Van Aller | Oct. 25, 1921 |
| 1,875,511 | Shivers | Sept. 6, 1932 |
| 1,974,302 | Finlayson | Sept. 18, 1934 |
| 1,994,728 | Persons | Mar. 19, 1935 |
| 2,043,668 | Kohler | June 9, 1936 |
| 2,052,536 | Shivers | Aug. 25, 1936 |
| 2,271,307 | Ray | Jan. 27, 1942 |
| 2,322,762 | Malone | June 29, 1943 |